Figure 3:
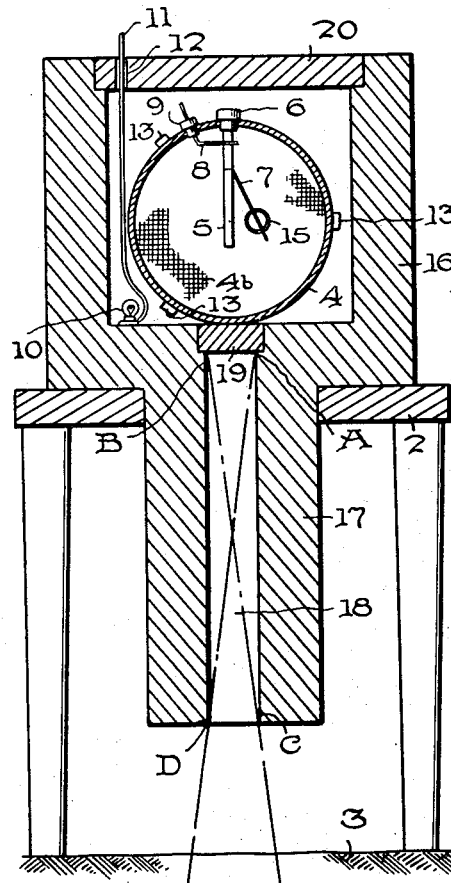

Feb. 15, 1949.  W. ARMSTRONG  2,461,800
APPARATUS FOR DETECTING AND MEASURING RADIANT ENERGY
FOR LOCATING SUBTERRANEAN PETROLEUM DEPOSITS
Filed March 6, 1945  2 Sheets-Sheet 1
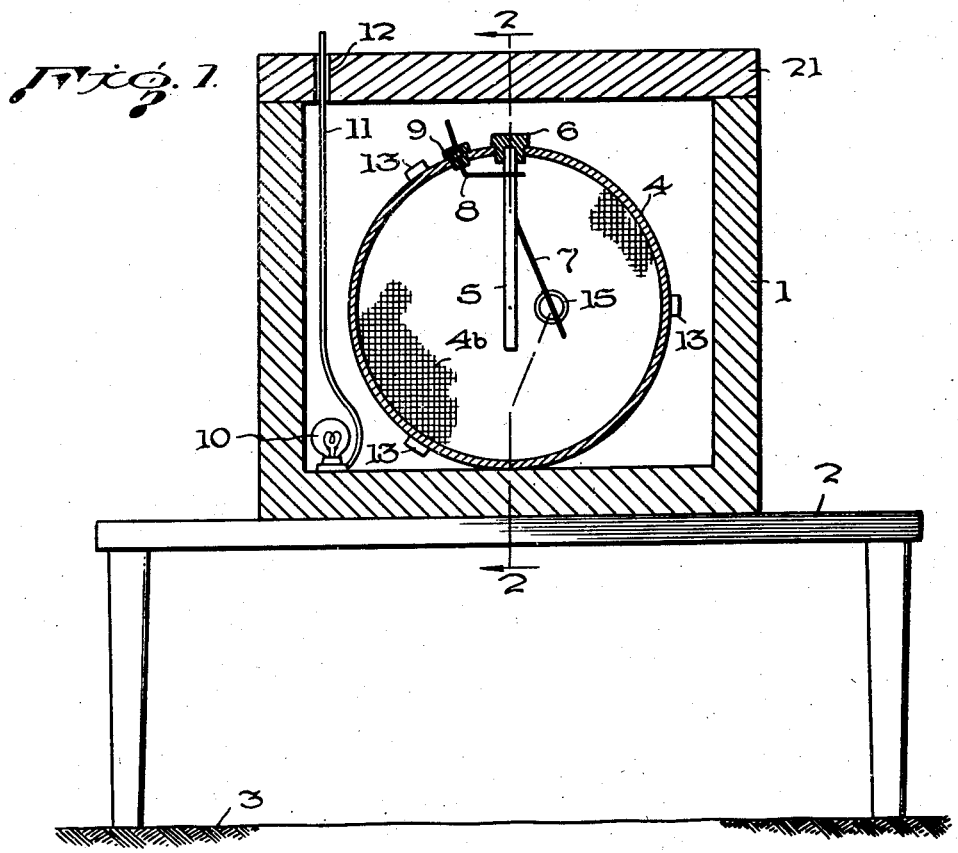
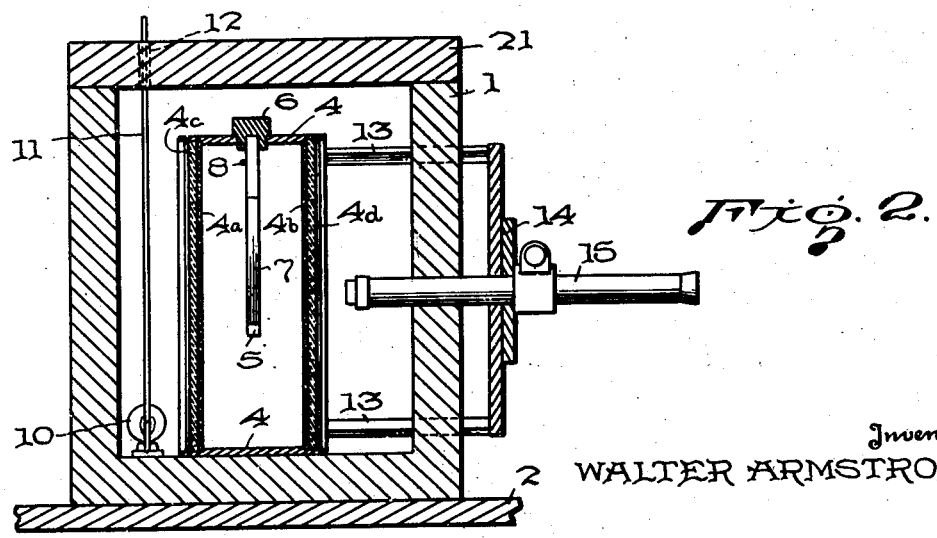
Inventor
WALTER ARMSTRONG
By John Q. Brady
Attorney Feb. 15, 1949.  W. ARMSTRONG  2,461,800
APPARATUS FOR DETECTING AND MEASURING RADIANT ENERGY
FOR LOCATING SUBTERRANEAN PETROLEUM DEPOSITS
Filed March 6, 1945  2 Sheets-Sheet 2

Inventor
WALTER ARMSTRONG
By John B. Brady
Attorney

Patented Feb. 15, 1949

2,461,800

UNITED STATES PATENT OFFICE 2,461,800

APPARATUS FOR DETECTING AND MEASURING RADIANT ENERGY FOR LOCATING SUBTERRANEAN PETROLEUM DEPOSITS

Walter Armstrong, Washington, D. C.

Application March 6, 1945, Serial No. 581,280

4 Claims. (Cl. 250—83.6)

This invention relates to the prospecting for subterranean petroleum deposits by providing apparatus for the detection and measurement of relative values of a penetrating radiant energy which emanates from subterranean petroleum deposits and passes through the intervening earth strata to the surface of the earth.

This application is a continuation-in-part of my co-pending application Serial No. 547,940, filed August 3, 1944, entitled "Method of detecting and measuring radiant energy for locating subterranean petroleum deposits."

I have found that the penetrating radiant energy emanating from subterranean petroleum deposits which reaches the earth's surface is proportional to the nature and amount of the subterranean petroleum deposit and the intervening earth strata. Because of the varied nature and intensities of this energy encountered in the various locations to be explored, various types of apparatus have been designed.

Through my construction and trial of apparatus I have learned that a negative electrostatic charge, when placed on the inner walls of a suitably shielded ionization chamber constructed of inactive material, has the peculiar property of uniting with electrons produced on the inner walls of the ionization chamber. I have also learned that when additional electrons, resulting from the penetration of external radiation to the inner walls of the shielded ionization chamber, are contacting the initially negatively electrostatically charged inner walls, these additional electrical charges on the inner walls will produce corresponding charges of the opposite polarity, or positive charges, on the ionization chamber electrode.

These new principles in the field of molecular and electron physics have been fully disclosed in my co-pending application Serial No. 547,940, filed August 3, 1944, entitled "Method of detecting and measuring radiant energy for locating subterranean petroleum deposits." My invention provides apparatus for utilization of the radiant energy emanating from subterranean petroleum deposits, adapted for field use in petroleum prospecting employing the method disclosed in my application No. 547,940, filed August 3, 1944.

In my apparatus I use an ionization chamber in an inclosing shield which shields the ionization chamber from earthly ionizing radiation incident upon said shield in geophysical explorations, such as alpha, beta, and gamma, as well as other ionizing radiation associated with the penetrating radiant energy emanating from subterranean petroleum deposits, all of which radiation accelerates the discharge of an ionization chamber charge. This application also discloses an ionization chamber in a modified inclosing shield, which shield except for a portion of the shield between the ionization chamber and the earth's surface shields the ionization chamber against the radiant energy emanating from subterranean petroleum deposits encountered in geophysical explorations as well as from the earthly ionizing radiation encountered.

The penetrating radiant energy which emanates from subterranean petroleum deposits which I detect and measure by the apparatus of my invention, has penetrating properties far greater than the above-described ionizing radiation which accelerates the discharge of an ionization chamber charge, and because of the great penetrating properties of the radiant energy reaching the earth's surface from subterranean deposits of petroleum, the petroleum deposit radiant energy penetrates through the inclosing shield provided in my apparatus for shielding the ionization chamber from the ionizing radiation encountered in a geophysical exploration that accelerates the discharge of an ionization chamber charge. The petroleum deposit emanations when penetrating the inclosing shield and on to the inner walls of the ionization chamber on which there has been placed a negative electrostatic charge, will cause additional electrons, or negative charges, to adhere to the initially negatively electrostatically charged inner walls. These added charges to the inner walls will cause a retardation in the dissipation or decay of the ionization chamber charge. Thus I have shown that the ionization chamber in my apparatus is used for the purpose of affording a shielded negative electrostatically charged surface for collecting electrons, or negative charges, thereon which additional charges on the inner walls of the ionization chamber are caused by the penetration to the ionization chamber of the penetrating radiant energy reaching the earth's surface from subterranean petroleum deposits.

The apparatus covered by this application, when coupled with my development of principles in the field of molecular and electron physics, set forth in my co-pending application Serial No. 547,940, supra, provides new and useful equipment for petroleum exploration.

The principal object of my invention is to provide apparatus for use in the direct location of subterranean petroleum deposits by utilizing the penetrating radiant energy which emanates from subterranean petroleum deposits.

Another object of my invention is to provide apparatus for locating subterranean petroleum deposits or new petroleum fields whose presence may never have been suspected because of the inadequacy of present methods of petroleum prospecting. These and other objects of my invention will be evident from the following disclosures and appended claims.

The apparatus of my invention will be more fully understood from the specification hereinafter following by reference to the accompanying drawings in which:

Figure 1 is a vertical longitudinal sectional view taken through one form of portable exploration apparatus embodying my invention; Fig. 2 is a vertical sectional view taken substantially on line 2—2 of Figure 1; Fig. 3 is a vertical sectional view of a modified form of exploration apparatus for carrying out the principles of my invention; and Fig. 4 is a vertical sectional view of the apparatus shown in Fig. 3 looking at the apparatus from the side and illustrating certain of the parts in side elevation.

The ionization chamber 4 in Figs. 1, 2, 3 and 4 may follow the general construction of any type of electroscope, electrometer, or other current or voltage measuring device. All those types of ionization chambers when embodying the principle of electrons, or negative charges, adhering to a negatively electrostatically charged surface for the purpose of collecting charges thereon, or in the case of an electrode or any multiple number of electrodes used for the purpose of ascertaining the extent of any additional charge being added thereon resulting from penetration to the ionization chamber of electrical radiant energy, come within the scope and sphere of my invention.

Figure 4:
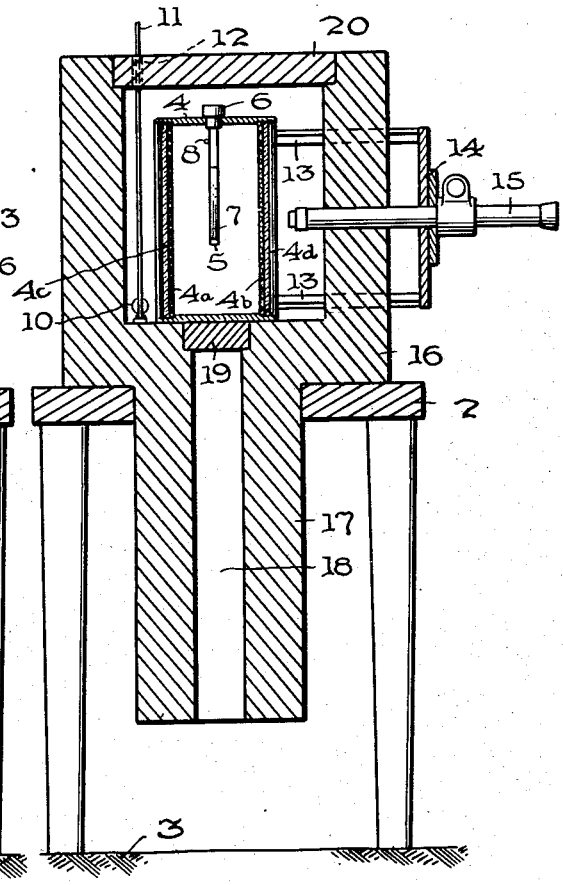

The inclosing shields portrayed in the drawings, shield 1 in Figs. 1 and 2 and shield 16 in Figs. 3 and 4, are single type shielding of pure inactive lead. However, the shield may be of any particular single, multiple, or combination, of metallic, non-metallic, liquid, or gaseous types of construction having physical properties of shielding or causing the disintegration of radiant energy or causing secondary radiation. As some examples of the metal shielding that may be used singly or in multiple or in alternation, there are lead, aluminum, soft zinc alloy and other metals having shielding or filtering properties with respect to shielding radiant energy. Wood is also used. Petroleum and kerosene have been used. As to gaseous shields which may be used, air, hydrogen or other gases may be used as shields, singly or in combination. All shielding when used for the purpose of shielding a negative electrostatically charged surface from the radiation that accelerates the normal rate of dissipation or decay of an ionization chamber charge yet permitting the penetrating radiant energy which emanates from subterranean petroleum deposits, in whole or in part sufficient for operation of the apparatus, to penetrate said shielding and pass on to the ionization chamber comes within the scope and sphere of my invention.

The figures portray an inclosing shield 1 in Figs. 1 and 2 and 16 in Figs. 3 and 4 in which there is an ionization chamber 4 containing an insulated electrode 5 and to this electrode is appended a strip of gold leaf 7. According to the accepted theory, when the electrode 5 is given a positive electrostatic charge, a corresponding charge of the opposite polarity, or negative, is produced on the inner walls or surface of the ionization chamber. When the electrode is given a positive electrostatic charge, the gold leaf strip appended thereto will extend away from the electrode and as the ionization chamber charge decays or dissipates, the gold leaf strip will fall back gradually toward the ionization chamber electrode. When additional electrons, or negative charges, are added to the initially negatively electrostatically charged inner walls of the suitably shielded ionization chamber, resulting from the penetration to the ionization chamber of the penetrating radiant energy which emanates from subterranean petroleum deposits, those added charges produce corresponding positive charges on the ionization chamber electrode charge which causes a retardation in the dissipation of the electrode charge over the normal rate of dissipation. This retardation is observed through a microscope extended through the inclosing shield around the ionization chamber, by noting the physical fall of a gold leaf strip appended to the ionization chamber electrode.

The inclosing shield 1 in Figs. 1 and 2, and the inclosing shield 16 in Figs. 3 and 4 shield from the ionization chamber and electrode therein, not only the known earthly ionizing radiation, but other ionizing radiation which also accelerates the dissipation or decay of an ionization chamber charge which I have found associated with the penetrating radiant energy which emanates from subterranean petroleum deposits. In addition, the inclosing shield 16 in Figs. 3 and 4 except portion 19 shield the ionization chamber and electrode therein against, the desired penetrating radiant energy emanating from subterranean petroleum deposits encountered in geophysical explorations. In other words, it may be stated that my apparatus isolates the discharging or ionizing radiation from the desired penetrating radiant energy emanating from subterranean petroleum deposits sufficient for operation of the apparatus, and it is this desired penetrating radiant energy that I utilize in the apparatus of my invention.

The inclosing shields therefore are an essential part of my invention. Shielding may be so constructed and designed to adequately separate in whole or in part, the two forms of earthly radiation involved, sufficient for operation of the apparatus. I have developed various types of shielding in apparatus for petroleum prospecting and exploration work, adapted to meet needs in operations under the greatly varying amounts of penetrating radiation encountered in field work. Fig. 1 portrays single type shielding so constructed that an indication of the general presence of subterranean petroleum deposit emanations is obtained whereby quick surveys of large areas can be obtained. Fig. 3 portrays substantially vertical shielding so that from given locations on the earth's surface, the location of underground petroleum deposits, the centers of maximum petroleum deposit radiation and the best location for drilling operations may be determined.

Referring to the drawings in detail, Figs. 1 and 2 diagrammatically show in cross section one form of apparatus of the lighter portable type.

The inclosing shield 1 rests on a stand 2 on or above the surface of the earth 3 or may be operated in excavations below the surface of the earth. Resting on the bottom side of the inclosing shield 1 is an electroscope type of ionization chamber 4 which may be constructed, for example, of brass or other suitable metal tubing with a meshed wire screen of brass or other suitable material 4a and 4b rear and front, backed by glass 4c and 4d to permit viewing the ionization chamber 4 through the front side and permitting light for observation purposes to enter from the rear. The meshed wire screen serves the purpose of dissipating any charge tending to accumulate on the glass surfaces when the apparatus is in use. The inclosing shield 1 shields the ionization chamber 4 on all sides from the earthly ionizing radiation that accelerates the dissipation or decay of an electrostatic charge placed on the electrode 5 within the ionization chamber 4.

In Fig. 1 the inclosing shield 1, which is diagrammatically represented, is constructed of pure inactive lead of the single metal type, in other words solid lead. This lead metal shields the ionization chamber 4 from the earthly ionizing radiation that accelerates the discharge of an ionization chamber charge encountered in geophysical explorations. The physical properties of the lead used to shield the earthly ionizing radiation from the ionization chamber depends upon its thickness and purity, and as the amount of such ionizing radiation to be shielded from the ionization chamber 4 in petroleum explorations is dependent upon the radiation encountered in the particular territory to be explored, the inclosing shield 1 may vary in its thickness or shielding capacity and still come within the scope and sphere of my invention.

In the type of ionization chamber shown in Figs. 1, 2, 3 and 4 used to show one type of ionization chamber which affords a shielded electrostatically negatively charged surface for the utilization of the radiant energy which emanates from subterranean petroleum deposits, an electrode 5 of brass or other suitable material extends axially into the ionization chamber 4 and is held in place and insulated from the walls of the ionization chamber 4 by insulator 6 and appended to the electrode 5 is a strip of gold leaf 7.

In field operation the shielded ionization chamber electrode 5 is given a positive electrostatic charge that extends the gold leaf strip 7 away from the electrode 5. The electrode 5 is given this positive electrostatic charge by means of manually contacting the positive electrostatically charged wire 8 to the electrode 5. The charged wire 8 passes through an insulator 9 in the walls of the ionization chamber 4. The positive electrostatic charge is placed on the wire 8 by contacting the wire 8 to a charging unit outside of the apparatus and the wire 8 is disconnected from the charging unit after the electrode 5 has been given the desired charge. The desired charge depends upon the size and construction of the ionization chamber 4. To place a positive electrostatic charge on the ionization chamber electrode 5, that part 21 of the inclosing shield 1 in Figs. 1 and 2 and part 20 of the inclosing shield 16 in Figs. 3 and 4 above the ionization chamber 4 are removed and after the electrode 5 has been given the desired number of electrostatic units charge to permit the gold leaf strip 7 to be viewed through a microscope 15 affixed at right angles to the gold leaf strip 7, the wire 8 is turned to the front or rear side of the ionization chamber 4 and made to contact the meshed wire screen 4a adjacent to the glass facing 4c at the rear or the meshed wire screen 4b adjacent to the glass facing 4d at the front of the ionization chamber 4 and that part 21 of the inclosing shield 1 and part 20 of the inclosing shield 16 above the ionization chamber 4 are put back in place.

To provide light for observation of the movement of the gold leaf strip 7 through the microscope 15 affixed to the ionization chamber 4 at right angles to the gold leaf strip 7, a battery light 10 is placed inside the inclosing shield 1. Electricity for the light 10 is supplied from an external source by means of the insulated duplex wire 11 passing through opening 12 in the top of the inclosing shield 1 in Figs. 1 and 2 and the inclosing shield 16 in Figs. 3 and 4.

Figs. 2 is a vertical sectional view of the apparatus shown in Fig. 1, the ionization chamber 4 being surrounded by the inclosing shield 1. The microscope 15 for observing the physical movement of the gold leaf strip 7 appended to the electrode 5 in ionization chamber 4 extends through an opening in shield 1 and is affixed to the ionization chamber 4 by means of metal strip fasteners 13 extending through shield 1 to an adjustable frame 14 in which the microscope 15 may be adjustably positioned as desired. Before engaging in field exploration with this type of apparatus, the normal rate of dissipation or decay of a positive electrostatic charge on the ionization chamber electrode 5 when shielded against earthly radiant energy is determined.

In field explorations at selected locations in the territory to be explored, the inner walls of the ionization chamber are given a negative electrostatic charge and subjected to the radiant energy which emanates from subterranean petroleum deposits, and any such radiation encountered will penetrate the inclosing shield 1 and on to the ionization chamber 4 and cause negative charges, or electrons, to contact and adhere to the electrostatically negatively charged inner walls of the ionization chamber 4 which will add corresponding positive charges on the ionization chamber electrode 5, which charges are detected and measured by observing a retardation in the normal rate of dissipation or decay of the manually placed positive electrostatic electrode charge at point of exploration. This retardation evidences the presence and the amount of such retardation evidences the relative amount or extent of the subterranean petroleum deposit emanations encountered in the general area under exploration. If no radiation from subterranean petroleum deposits in quantity sufficient to operate the apparatus has been encountered, no retardation will be observed.

Referring to Fig. 3 I have shown a vertical sectional view of an apparatus constructed according to my invention for the detection and measurement of relative values of a radiant energy which emanates from subterranean petroleum deposits and is adapted for ascertaining the radiation from a limited area of the petroleum deposit.

Fig. 4 is a vertical sectional view of the apparatus shown in Fig. 3 looking at the apparatus from one side. The ionization chamber 4 is completely surrounded by the inclosing shield 16. The microscope 15 for observing the physical movement of the gold leaf strip 7 appended to the electrode 5 in the ionization chamber 4 extends through shield 16 and is affixed to the ionization chamber 4 by means of metal strip fasteners 13 extending through the inclosing shield 16 to an adjusting frame 14 in which the microscope 15 may be adjustably positioned as desired.

The inclosing shield 16 rests on a stand or table 2 on or above the surface of the earth 3 although it may be placed in an excavation beneath the surface of the earth.

Construction and operation of the ionization chamber 4, the operation in placing an initial electrostatic charge in ionization chamber 4, in inclosing shield 16 with top portion designated as 20, and providing light for observation of the movement of the gold leaf strip 7 are the same as provided for in Figs. 1 and 2.

With the ionization chamber 4 in Figs. 3 and 4 shielded by the inclosing shield 16 from the earthly ionizing radiation that accelerates the rate of discharge of an ionization chamber charge faster than its normal rate of dissipation or decay, and with the inclosing shield 16, except portion 19, shielding the ionization chamber against the radiant energy emanating from subterranean petroleum deposits, the penetrating radiant energy emanating from subterranean petroleum deposits will pass through the recess 18 and penetrate portion 19 of the inclosing shield 16 and on to the ionization chamber 4 and cause electrons, or negative charges, to be produced on the initially negatively electrostatically charged inner walls of the ionization chamber 4. Those added charges to the inner walls of the ionization chamber 4 will produce corresponding charges of the opposite polarity, or positive charges, on the ionization chamber electrode 5 which causes a retardation in the rate of dissipation or decay of the initial ionization chamber charge over and above its normal rate of dissipation or decay. It is this retardation that is observed and measured in petroleum explorations. In the absence of petroleum deposit emanations penetrating shield portion 19 no retardation would be observed. The functional use of this apparatus is therefore for observing such retardation. In shield 16 is an axial recess 18 extending upward toward the ionization chamber 4 to the bottom portion 19 of the inclosing shield 16. The inclosing shield 16 including bottom portion 19 and top portion 20 has shielding capacity sufficient to shield the ionization chamber 4 from earthly ionizing radiation that accelerates the dissipation or decay of an ionization chamber charge. The penetrating radiant energy emanating from subterranean petroleum deposits detected and measured by this apparatus is much more penetrating than the ionizing radiation above mentioned. The thickness of the lead or shielding capacity of portions 19 and 20 of the inclosing shield 16 needed to shield the ionizing radiation from the ionization chamber 4 is therefore less than required for shielding the ionization chamber 4 against the subterranean petroleum deposit emanations.

The top shielding or portion 20 of the inclosing shield 16 above the ionization chamber 4 only shields the ionizing radiation from the ionization chamber 4. The inclosing shield 16, except portions 19 and 20, also has shielding capacity sufficient to shield the ionization chamber 4 against the penetrating radiant energy emanating from subterranean petroleum deposits all or in part sufficient for operation of the apparatus. It can be seen that the inclosing shield 16 serves two purposes: first, shielding the ionizing radiation from the ionization chamber 4, and second, shielding the ionization chamber 4 against the petroleum deposit emanations so that in efficient operation of the apparatus any petroleum deposit emanations that can be detected and measured by this apparatus will pass through the recess 18 and penetrate portion 19 of the inclosing shield 16 and on to the ionization chamber 4.

The shielding portrayed in Figs. 3 and 4 I term variable, directional, shielding. Vertical in direction, because the radiant emanating energy from subterranean petroleum deposits detected and measured by this apparatus is that radiation radiating vertically upward or nearly so to the earth's surface from the petroleum deposit 21 and variable because the width of the recess 18 may be varied. In the apparatus in Figs. 3 and 4 I normally use a recess of two inches in diameter which has permitted sufficient petroleum deposit emanations to penetrate portion 19 of the inclosing shield 16 and on to the ionization chamber 4 to permit efficient operation of the apparatus.

When shield 16 represented at 17 extends twelve inches from the ionization chamber 4 and with a recess of two inches in diameter therein, the projected area of the subterranean petroleum deposit 21 from which radiation will be relatively detected and measured by the apparatus will be the distance EF defined by the extension of the straight line BC to E and the straight line AD to F. If the recess 18 is made narrower the projected area FE will be smaller.

In the foregoing description and explanation of my invention, I have utilized certain specific forms of construction to more clearly explain the principles upon which it operates, and to so fully describe some possible forms of my invention that construction and proper use of the apparatus will effectively demonstrate the theory, the use, and the utility of my invention.

It must be understood however, that construction of my apparatus may reasonably follow well recognized forms of apparatus not specifically described in the foregoing description and drawings and still come within the scope and sphere of my invention, provided that the fundamental and unique requirement of separation of the charging-effect radiation from the discharging-effect radiation is accomplished as described in my invention.

When this basic requirement is accomplished for the purpose of indicating, locating and measuring subterranean petroleum deposits, I specifically claim that my invention does and may include and fully covers any reasonable form of electroscope or electrometer or any current or voltage measuring device operating on physics principles when used to indicate or measure the charge on an ionization chamber electrode, electrodes, or ionization chamber walls, when such ionization chamber and charge measuring apparatus is combined and shielded with any effective shielding constructed for the purpose of separating the charging from the discharging form of radiation, whether such shielding be in single or multiple form, whether metallic, non-metallic, solid, liquid or gaseous, and when such ionization chamber electrode, electrodes or ionization chamber wall charge measuring apparatus and shielding, are so combined in any of the many possible reasonable mechanical constructions so that its use in the exploration for, and the measuring of radiation from underground petroleum deposits, may be made easier and more effective.

It is emphatically stated that all metals use in the construction of the apparatus described in this application must be pure, inactive and absolutely free from any entrapped energy or bound electrical charges.

Obviously many other modifications and variations of the invention as hereinbefore set forth may be made without departing from the spirit and scope thereof, and therefore only such limitations should be imposed as are indicated by the appended claims.

What I claim and desire to secure by Letters Patent of the United States is as follows:

1. Apparatus for detecting radiant energy emanating from subterranean petroleum deposits encountered in a geophysical exploration, comprising an ionization chamber, shielding substantially impervious to earthly ionizing radiation incident upon said shielding surrounding the ionization chamber, and means for measuring the change in the ionization chamber charge during the operation of the apparatus.

2. Apparatus for locating subterranean petroleum deposits, comprising an ionization chamber with an electrode extending therein, shielding substantially impervious to earthly ionizing radiant energy incident upon said shielding surrounding the ionization chamber, and a microscope extending through one side of the surrounding shielding for determining the relative amount of the radiant energy emanating from subterranean petroleum deposits penetrating said shielding.

3. Apparatus detecting radiant energy emanating from subterranean petroleum deposits encountered in a geophysical exploration for locating subterranean petroleum deposits, comprising an ionization chamber, shielding surrounding the ionization chamber for shielding said chamber against earthly radiant energy except for a portion of said shielding between the ionization chamber and the earth's surface with the excepted portion of the surrounding shielding substantially impervious to earthly ionizing radiation incident upon said portion, and means for measuring the change in the ionization chamber charge during the operation of the apparatus.

4. Apparatus detecting radiant energy emanating from subterranean petroleum deposits encountered in a geophysical exploration for locating subterranean petroleum deposits, comprising an ionization chamber with an electrode extending therein, shielding surrounding the ionization chamber for shielding said chamber against earthly radiant energy except for a portion of said shielding between the ionization chamber and the earth's surface with the excepted portion of the surrounding shielding substantially impervious to earthly ionizing radiation incident upon said portion, and a microscope extending through one side of the surrounding shielding for determining the relative amount of petroleum deposit emanations encountered from a limited area of the earth's substrata.

WALTER ARMSTRONG.

REFERENCES CITED

The following references are of record in the file of this patent:

UNITED STATES PATENTS

| Number | Name | Date |
| --- | --- | --- |
| 1,933,063 | Kolhorster | Oct. 31, 1933 |
| 2,197,453 | Hassler | Apr. 16, 1940 |
| 2,265,966 | Gebauer | Dec. 9, 1941 |
| 2,285,840 | Scherbatskoy | June 9, 1942 |
| 2,296,176 | Neufeld | Sept. 15, 1942 |
| 2,316,361 | Piety | Apr. 13, 1943 |
| 2,330,829 | Lundberg | Oct. 5, 1943 |

FOREIGN PATENTS

| Number | Country | Date |
| --- | --- | --- |
| 340,231 | Great Britain | Dec. 12, 1930 |

OTHER REFERENCES

"Radiology," vol. 27, 1936 (2), pages 149–157. (Copy in Div. 54.)

"Scientific American," Sept. 1935, pp. 131 and 132.